J. T. FLUHARTY.
SCALDING APPARATUS.
APPLICATION FILED JULY 22, 1918.
1,294,335.
Patented Feb. 11, 1919.
2 SHEETS—SHEET 1.
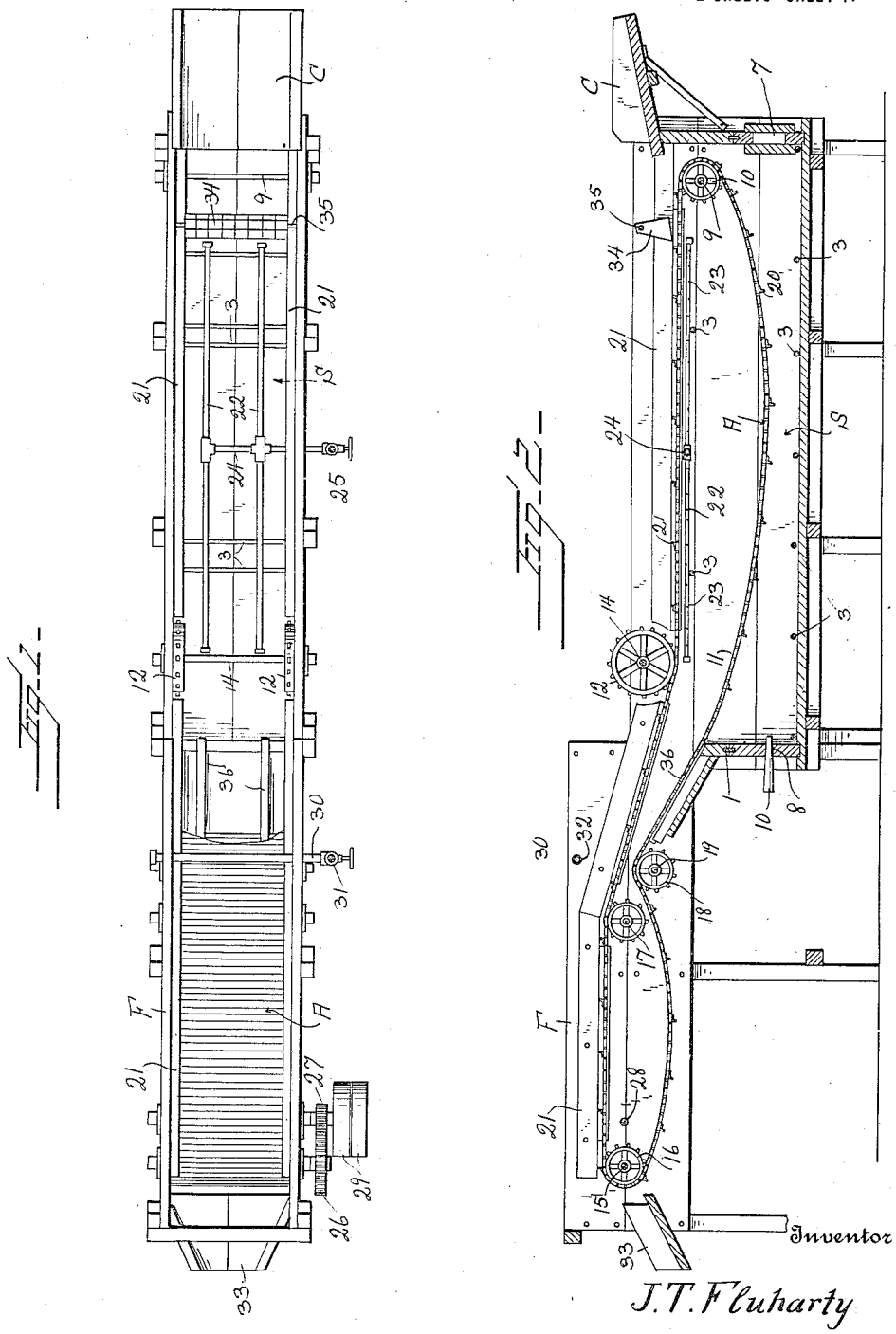
Inventor
J. T. Fluharty
By Watson E. Coleman
Attorney

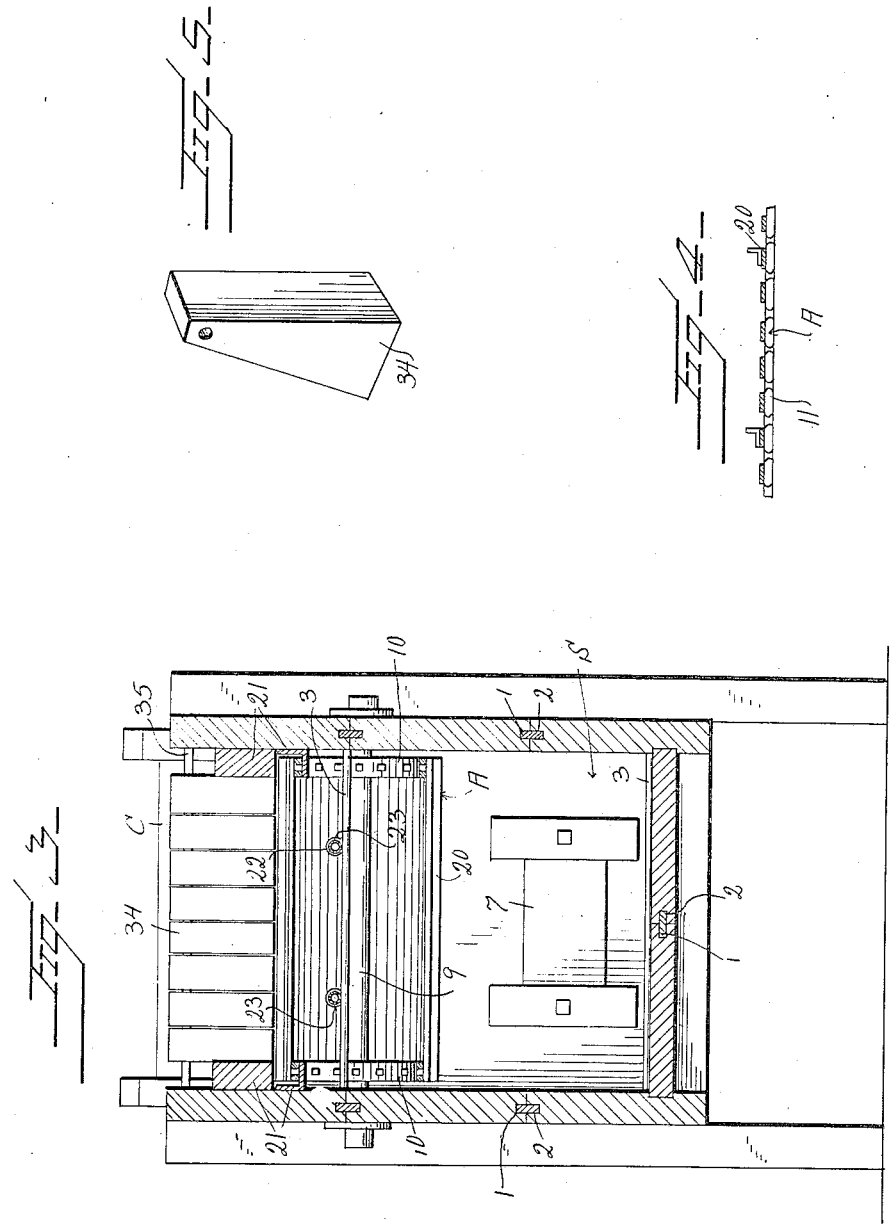

UNITED STATES PATENT OFFICE.

JAMES T. FLUHARTY, OF PRESTON, MARYLAND.

SCALDING APPARATUS.

1,294,335.  Specification of Letters Patent.  Patented Feb. 11, 1919.

Application filed July 22, 1918. Serial No. 246,023.

*To all whom it may concern:*

Be it known that I, JAMES T. FLUHARTY, a citizen of the United States, residing at Preston, in the county of Caroline and State of Maryland, have invented certain new and useful Improvements in Scalding Apparatus, of which the following is a specification, reference being had to the accompanying drawings.

This invention relates to certain improvements in scalding apparatus and has relation more particularly to a device of this general character especially designed and adapted for use in canneries for scalding tomatoes or the like whereby the peeling of tomatoes may be facilitated and it is an object of the invention to provide a novel and improved apparatus of this general character wherein the tomatoes or the like to be scalded are first emerged within a fluid of high temperature and then subjected to a spray of liquid of a materially lower temperature.

The invention also has for an object to provide a novel and improved apparatus of this general character including a tank adapted to contain a liquid, preferably water, together with a conveyer for the tomatoes or the like to be treated which travels through the tank below the water line and wherein steam is discharged within the tank below the water line and adjacent the conveyer or below the portion of the conveyer carrying the tomatoes or the like and whereby the liquid or water within the tank is heated and agitated.

Another object of the invention is to provide a novel and improved apparatus of this general character including a conveyer traveling through a scalding tank or the like together with means for controlling the delivery of the tomatoes or other fruit upon the conveyer.

An additional object of the invention is to provide a novel and improved apparatus of this class embodying an endless conveyer having the opposite end portion of its upper or working stretch traveling at different altitudes and wherein the lower portion of said stretch travels through a scalding medium and wherein the upper or opposite end portion of the stretch serves as an assorting table together with means for discharging a cooling medium upon the tomatoes or other fruit after the same have been withdrawn from the scalding medium and before the same reach the higher portion of the working stretch of the conveyer or the portion of the conveyer which serves as an assorting table.

The invention consists in the details of construction and in the combination and arrangement of the several parts of my improved scalding apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan of a scalding apparatus constructed in accordance with an embodiment of my invention;

Fig. 2 is a longitudinal vertical sectional view taken through the device as disclosed in Fig. 1;

Fig. 3 is a transverse sectional view on an enlarged scale taken through the device adjacent the receiving end of the scalding tank;

Fig. 4 is a fragmentary view partly in elevation and partly in section of the conveyer as herein employed; and Fig. 5 is a view in perspective of one of the swinging or rocking fingers as herein employed detached.

As disclosed in the accompanying drawings S denotes a scalding tank preferably rectangular in top plan and having its top open. It is preferred that the tank be made of wood with the planks comprised in the bottom and walls thereof connected by a water tight seal afforded by a strip 1 seated within mortises 2 produced in the opposed edges of adjacent planks. The side walls of the tank are braced or reinforced by the transversely disposed rods 3 arranged in two horizontally disposed series, one of said series being adjacent the bottom of the tank and the other at the upper portion of the tank or below the water line. The tank S is adapted to be substantially entirely filled with water and during the working operation water is constantly discharged within the tank at the receiving end thereof while the overflow is discharged at the opposite end of the tank. By this means the water is maintained clean. The receiving end of the tank S is provided with a door 7 to facilitate the removal of sediment collected upon the bottom of the tank and the opposite end portion of the tank is provided with a drain opening 8 normally closed by a removable plug 10 or the like.
Supported by the receiving end of the tank S is a chute C delivering within the tank through the open top thereof and upon which the tomatoes or other fruit to be treated are initially deposited. The chute C is on such incline as to cause the tomatoes or other fruit to be delivered within the tank S or more particularly upon the conveyer A (to be hereinafter referred to) by gravity.

Supported by the receiving end portion of the side walls of the tank S is a transversely disposed shaft 9 having fixed thereto, within the tank and adjacent said side walls, sprocket wheels 10. Disposed around the sprocket wheels 10 are the endless chains 11 comprised in the conveyer A. The upper stretches of the chains 11 pass beneath and engage the sprocket wheels 12 fixed to the shaft 14. The shaft 14 is disposed transversely of the tank S and is supported by the side walls thereof at a point above the horizontal plane occupied by the shaft 9 so that the upper stretches of the chains 11 between the sprockets 10 and 12 will travel in substantially a horizontal path with both of said chains in the same horizontal plane. The side walls of the tank S are continued by the side frame or walls F positioned thereabove and the forward or outer end portions of said frames or walls F rotatably support the transversely disposed shaft 15 having fixed thereto sprockets 16 over which the chains 11 are directed. Inwardly of the shaft 15 and in horizontal alinement therewith is a second transversely disposed shaft 17 rotatably supported to the said frames or walls F and over which the upper stretches of the chains 11 travel and engage whereby the portions of the upper stretches of the chains 11 intermediate the shafts 15 and 17 travel in substantially a horizontal path and in a plane above the portion of the upper stretches of the chains 11 intermediate the shafts 9 and 14. The lower stretches of the chains 11 pass over the sprocket wheels 18 fixed to the transversely disposed shaft 19 rotatably supported to the frames or side walls F at a point inwardly of the shaft 17 and in a plane therebelow so that said lower strips of the chains 11 may readily return within the tank S.

The conveyer A also includes the transversely disposed strips 20 suitably secured to the side chains 11 and the opposite end portions of the strips 20 comprised in the upper stretch of the conveyer pass between the vertical spaced guide strips 21 carried by the inner faces of the side walls of the tank S and of the frames or walls F whereby said upper stretch of the conveyer A is held against sagging and travels in its desired paths.

The upper series of the brace rods 3 are positioned below or in close proximity to the upper stretch of the portion of the conveyer A within the tank S and resting upon and supported by said rods are the longitudinally disposed pipes 22. Each of the pipes 22 is provided in its opposite side walls with the longitudinally spaced openings 23 and both of said pipes 22 are in communication with the pipe 24 leading from a source of steam supply. Interposed in the pipe 24 is the controlling valve 25. The steam discharged through the openings 23 in the pipes 22 serves to bring water within the tank to a boiling point and which results in an agitation at the upper or water line portion of the liquid. As is particularly illustrated in the accompanying drawings the upper stretch of the portion of the conveyer A within the tank S carries the tomatoes or other fruit delivered thereon in submergence through this agitated surface of the liquid and which results in an effective loosening of the skin. The conveyer A travels at a speed carrying tomatoes or other fruit through the tank S in a period of time between fifteen to twenty-five seconds so that cooking of the meat of the tomatoes or other fruit and the resultant souring thereof when brought in contact with the air is prevented.

The conveyer A may be driven in any manner desired but as herein set forth the shaft 15 has an end portion extended beyond one of the frames or walls F and fixed to said extended portion is a gear wheel 26 meshing with a smaller gear 27 secured to a shaft 28 rotatably supported by the frames or walls F. The shaft 28 is adapted, as herein set forth, to be driven by a belt coacting in a conventional manner with the loose and fixed pulleys 29 arranged in a conventional manner upon the shaft 28.

Supported by the frames or walls F inwardly of the shaft 17 and above the upper stretch of the conveyer A is a transversely disposed pipe 30. Leading from a suitable source of water supply and interposed in said pipe 30 is a controlling valve 31. The under wall of the pipe between the frames or walls F is provided with the restricted openings 32 whereby a spray of water is discharged upon the tomatoes or other fruit after passing through the scalding medium within the tank S and which spray, owing to its lower temperature causes the skin of the tomatoes or fruit to contract and crack which puts the tomatoes or fruit in the most favorable condition to be skinned.

The upper stretch of the conveyer A delivers to the chute or spout 33 so that the tomatoes or other fruit may be readily collected in suitable receptacles such as baskets or the like. The portion of the upper stretch of the conveyer A between the shafts 15 and 17 serves as an assorting table and which is of particular importance when it is desired to convert the smaller tomatoes or other fruit into pulp. In order to prevent the tomatoes or other fruit from being fed too fast from the chute C upon the upper stretch of the conveyer A and in order to distribute the fruit upon said stretch I find it of particular advantage to provide the swinging or rocking fingers 34 positioned at a point inwardly of or in close proximity to the shaft 9 and above the upper stretch of the conveyer A. As herein disclosed the fingers 34 are suspended from the transversely disposed rod 35 secured to the side walls of the tank S. All of the fingers 35 are substantially triangular in form and have their lower ends closely approaching the upper stretch of the conveyer A. In practice the position of the upper stretch of the conveyer A within the tank S is about six inches below the water line and which assures the tomatoes or other fruit to be properly submerged within the agitated portion of the water within the tank. By having the water within the tank agitated only at the upper portion thereof is of particular advantage because the dirt washed from the fruit or carried within the tank by the fruit when delivered from the chute C will drop to the bottom of the tank and remain undisturbed.

To further facilitate the return of the lower stretch of the conveyer A within the tank S I find it of advantage to provide the guide strips 36 inclined downwardly toward the delivery end of the tank S and with which the lower stretch of the conveyer A contacts.

From the foregoing description it is thought to be obvious that a scalding apparatus constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim—

1. An apparatus of the class described comprising a conveyer, means for subjecting said conveyer to a scalding medium and a plurality of swinging fingers suspended above the conveyer adjacent the receiving end thereof for controlling the delivery upon the conveyer.

2. An apparatus of the class described comprising a scalding tank, a conveyer traveling therein, a chute arranged at the receiving end of the conveyer and delivering thereon, a transversely disposed rod supported by the tank above the receiving end of the conveyer and swinging fingers suspended from the rod, said fingers controlling the delivery upon the conveyer and effecting a distribution thereover.

In testimony whereof I hereunto affix my signature in the presence of two witnesses.

JAMES T. FLUHARTY.

Witnesses:
 CHARLES B. HARRISON,
 JAS. O. WRIGHT.